US007831279B2

United States Patent
Croome

(10) Patent No.: US 7,831,279 B2
(45) Date of Patent: *Nov. 9, 2010

(54) WIRELESS ENABLED MEMORY MODULE

(75) Inventor: Martin Croome, Brié et Angonnes (FR)

(73) Assignee: Socket Mobile, Inc., Newark, CA (US)

(*) Notice: Subject to any disclaimer, the term of this patent is extended or adjusted under 35 U.S.C. 154(b) by 139 days.

This patent is subject to a terminal disclaimer.

(21) Appl. No.: 12/253,975

(22) Filed: Oct. 19, 2008

(65) Prior Publication Data

US 2009/0264153 A1 Oct. 22, 2009

Related U.S. Application Data

(63) Continuation of application No. 10/510,651, filed as application No. PCT/US03/10532 on Apr. 8, 2003, now Pat. No. 7,440,774.

(60) Provisional application No. 60/390,019, filed on Jun. 19, 2002, provisional application No. 60/370,682, filed on Apr. 8, 2002.

(51) Int. Cl.
*H04M 1/00* (2006.01)
*H04B 1/38* (2006.01)

(52) U.S. Cl. .......... 455/557; 455/550.1; 455/556.1; 455/556.2; 455/558

(58) Field of Classification Search .......... 455/3.06, 455/41.2–41.3, 66.1, 403, 418–420, 514, 455/550.1, 552.1, 556.1–556.2, 557–559, 455/517, 564; 711/1–6, 103–104, 149, 101, 711/112, 115–116

See application file for complete search history.

(56) References Cited

U.S. PATENT DOCUMENTS

| | | | | |
|---|---|---|---|---|
| 6,286,060 | B1* | 9/2001 | DiGiorgio et al. | 710/31 |
| 6,693,586 | B1* | 2/2004 | Walters et al. | 342/357.13 |
| 6,945,461 | B1* | 9/2005 | Hien et al. | 235/451 |
| 7,044,605 | B2* | 5/2006 | Olson et al. | 353/30 |
| 7,107,378 | B1* | 9/2006 | Brewer et al. | 710/300 |
| 7,221,961 | B1* | 5/2007 | Fukumoto et al. | 455/557 |
| 7,367,503 | B2* | 5/2008 | Harai et al. | 235/441 |
| 2004/0266480 | A1* | 12/2004 | Hjelt et al. | 455/558 |
| 2005/0130728 | A1* | 6/2005 | Nguyen et al. | 463/16 |

OTHER PUBLICATIONS

Jan. 1, 2010 EPO Examination Report for related case EP 03 717 001.6.

* cited by examiner

*Primary Examiner*—Meless N Zewdu
(74) *Attorney, Agent, or Firm*—PatentVentures; Bennett Smith; Korbin Van Dyke

(57) ABSTRACT

A wireless-enabled memory module provides host devices access to a memory via a standard memory expansion interface and further incorporates embedded processing capability and a wireless network capability. The wireless-enabled memory module can be used in any host device providing a compatible memory card controller and interface. Host devices so equipped become wireless-memory enabled devices and can provide memory access to any other remote device enabled for compatible wireless communications. It is thereby possible for a remote device to access the memory content of the memory module, and cause transfers of either full-size or scaled versions of the content to the remote device through a first network, and optionally further transfer the content from the remote device through a second network to the Internet in the form of an e-mail message or MMS attachment.

20 Claims, 4 Drawing Sheets

WIRELESS ENABLED MEMORY MODULE

CROSS REFERENCE TO RELATED APPLICATIONS

This application is a continuation of U.S. Non-Provisional patent application Ser. No. 10/510,651, filed Oct. 8, 2004, now U.S. Pat. No. 7,440,774) entitled WIRELESS ENABLED MEMORY MODULE, which is incorporated by reference for all purposes and is a 371 of international Application Serial No. PCT/US03/10532, filed Apr. 8, 2003) entitled WIRELESS ENABLED MEMORY MODULE, which claims the benefit of U.S. Provisional Patent Application Ser. No. 60/390,019, filed Jun. 19, 2002) entitled ENABLED MEMORY MODULE, as well as the benefit of U.S. Provisional Patent Application Ser. No. 60/370,682, filed Apr. 8, 2002) entitled ENABLED MEMORY MODULE.

SUMMARY

A wireless-enabled memory module (WEMM) in accordance with the invention provides devices access to a memory via a standard memory interface and further incorporates embedded processing capability and a wireless network capability. This card can be used in any host device providing a compatible memory card controller and interface. Host devices equipped with a WEMM become wireless-memory enabled devices (WMED). WEMMs and WMEDs can communicate with any other remote device enabled for compatible wireless communications. Remote devices so enabled are referred to herein as Remote Wireless-enabled Devices (RWED).

The wireless network capability and embedded processing of the WEMM provides RWEDs (such as a mobile phone, PDA, or PC) read and write access to the contents of the memory in the WEMM via a wireless connection, such as a BlueTooth connection in an illustrative embodiment. As an implementation option, the memory of the WEMM may be embedded, may be a removable flash memory card, or both.

The RWED can use this wireless access provided by the WEMM to perform selective data transfers between the WEMM's memory and internal storage within the RWED. Additionally, by e-mail or MMS attachments sent via an additional network, the RWED may act as an intermediary to transfer data (in either direction) between the WEMM's memory and the Internet. For example, a BlueTooth-enabled mobile phone user could access a WEMM that is inserted in a digital camera host. The user could send a friend one or more photos as an e-mail message. The e-mail would result in the transfer of some or all of the stored images from the camera host over the BlueTooth connection to the remote mobile phone, and then to the Internet via the mobile phone network. Similarly, received attachments may be stored to the WEMM.

As a further implementation option, the embedded processing on the WEMM may include a media-scaling engine that can scale the contents to different sizes before transmission over the wireless connection. This enables the user to browse the memory contents in thumbnail form quickly and easily from the remote device. It also permits the user to retrieve a version of the selected content that has been scaled appropriately for the bandwidth capabilities of the BlueTooth connection or mobile network. In a preferred embodiment, the media-scaling engine is implemented using signal processing hardware. However, some or all of its functionality may be also implemented via firmware in the processor subsystem.

DETAILED DESCRIPTION

Figure 1:
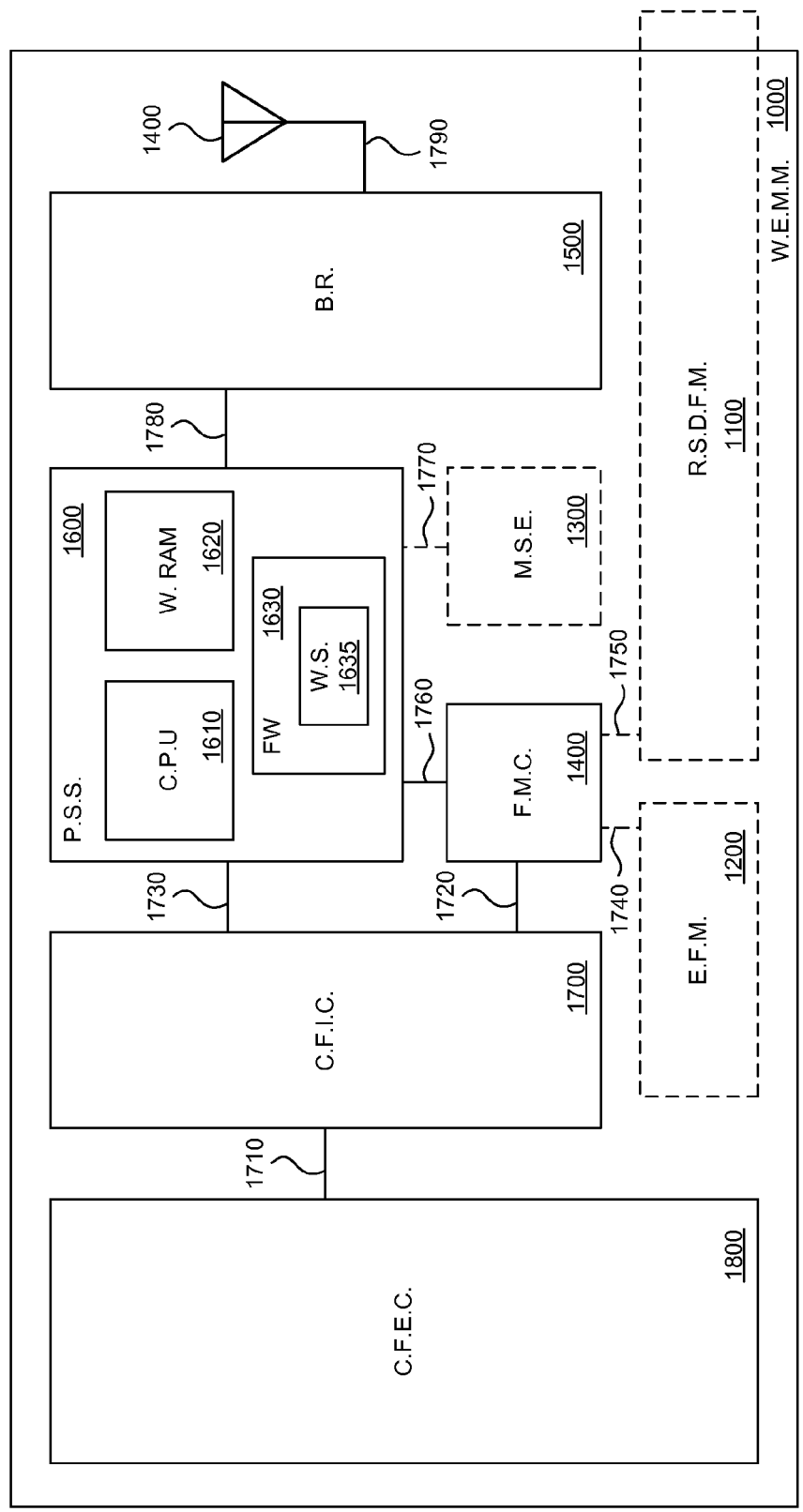
FIG. 1 is a block diagram of a wireless-enabled memory module (WEMM) 1000, physically and electrically compatible with the Compact Flash expansion module standard, and in accordance with the present invention.

Table 1 identifies and expands the abbreviations used in FIG. 1.

TABLE 1

| Associated ID No. | Abbreviation(s) | Expanded Name |
| --- | --- | --- |
| 1000 | W.E.M.M. | Wireless Enabled Memory Module |
| 1100 | R.S.D.F.M. | Removable Secure Digital Flash Memory |
| 1200 | E.F.M. | Embedded Flash Memory |
| 1300 | M.S.E. | Media Scaling Engine |
| 1400 | F.M.C. | Flash Memory Controller |
| 1500 | B.R. | Bluetooth Radio |
| 1600 | P.S.S. | Processor Sub-System |
| 1610 | C.P.U. | Processor |
| 1620 | W.RAM | Working RAM |
| 1630 | FW | Firmware |
| 1635 | W.S. | Web Server |
| 1700 | C.F.I.C | CompactFlash Interface Controller |
| 1800 | C.F.E.C. | CompactFlash Expansion Connector |

In the illustrative embodiment of FIG. 1, the WEMM 1000 and interface (1700, 1710, and 1800) to the host are compatible with the Compact Flash industry standard. The WEMM's memory includes both embedded flash memory 1200 and removable flash memory 1100 compatible with the Secure Digital (SD) industry standard. The wireless network is a Wireless Personal Area Network (WPAN) compatible with the Bluetooth industry standard.

As will be appreciated by those skilled in the art, the specifics of each implementation will dictate the particular requirements of the wireless interface. In an illustrative embodiment intended primarily for use with mobile phones, a low-speed, low-cost, Bluetooth interface 1500 is used. In another illustrative embodiment intended primarily for use with computing devices, such as PCs, a higher-speed, higher-cost, Bluetooth interface is used. The higher speed interface will reduce the time required to transfer a given file and will make the transfer of larger multimedia objects (e.g. higher resolution images and higher quality music) more practical. It will be appreciated by those skilled in the art that the baseband functions of the radio may be stored in the WEMM's integral firmware and performed via the WEMM's integral processor.

Note that the WEMM 1000 constitutes a first-level removable module and the removable flash memory 1100 constitutes a second-level removable module. It will be appreciated by those skilled in the art that there are a number of choices for each of these miniature-form-factor standard interfaces. Thus the WEMM 1000 is not restricted to the CF standard, and the removable flash memory 1100 is not restricted to the SD standard.

A first system application of the WEMM is the wireless transfer of digital photos between a camera and a mobile phone, for associated transfer via the mobile phone network. There is a large installed base of digital cameras that use standard removable memory cards, but do not have I/O expandability or wireless network functionality. These cameras can be augmented with a wireless-enabled memory module, in accordance with the present invention, to send photos via a mobile phone or any other compatibly enabled wireless communications device.

Figure 2:
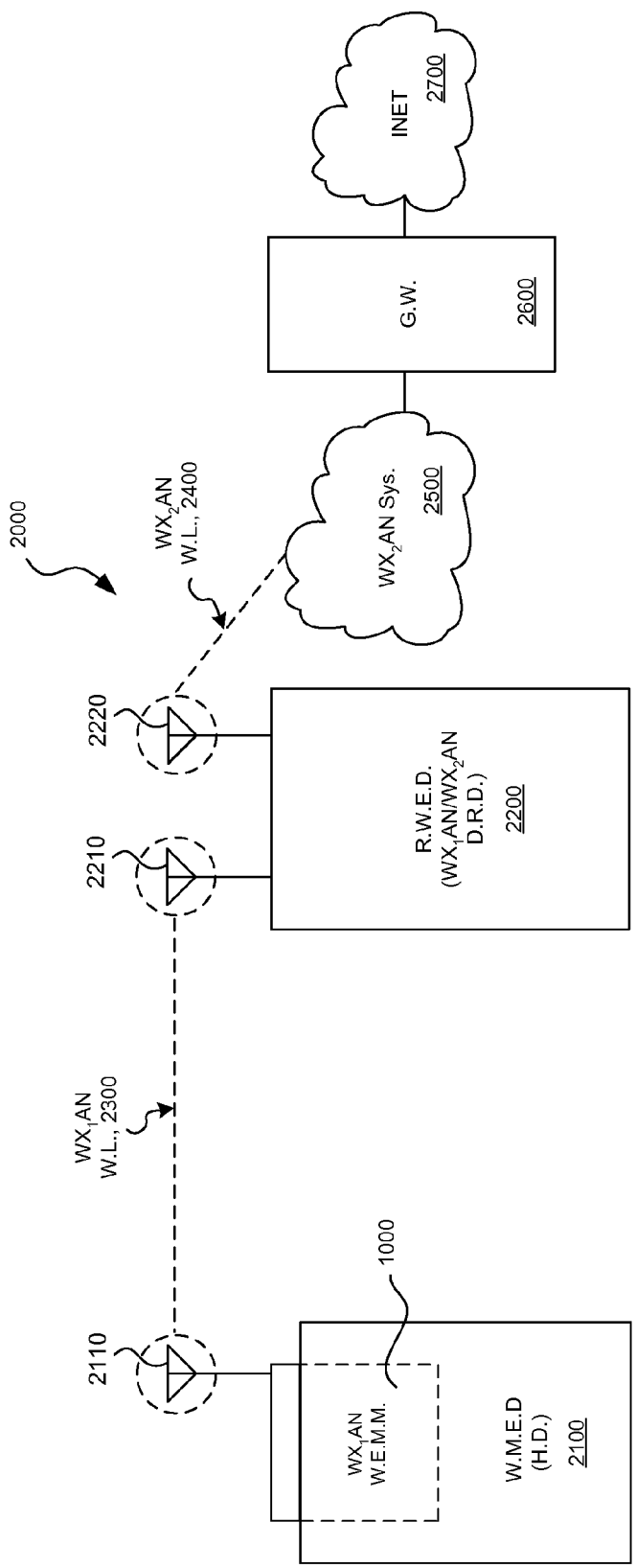
FIG. 2 is a diagram of a system 2000, in accordance with the present invention, illustrating how data on a host device 2100 equipped with a WEMM 1000 may be transmitted over a variety of networks (including 2300, 2500, and 2700).

Table 2 identifies and expands the abbreviations used in FIG. 2.

TABLE 2

| Associated ID No. | Abbreviation(s) | Expanded Name |
|---|---|---|
| 2000 | (none) | (none) |
| 2100 | W.M.E.D. (H.D.) | Wireless Memory Enabled Device (Host Device) |
| 2200 | R.W.E.D. (WX$_1$AN/ WX$_2$AN D.R.D.) | Remote Wireless Enabled Device (WX$_1$AN/WX$_2$AN Dual Remote Device) |
| 2300 | WX$_1$AN W.L. | WX$_1$AN Link |
| 2400 | WX$_2$AN W.L. | WX$_2$AN Link |
| 2500 | WX$_2$AN SYS | WX$_2$AN System |
| 2600 | G.W. | Gateway |
| 2700 | INET | Internet |

A general application for the invention is the illustrative system 2000 of FIG. 2. FIG. 2 illustrates a host device having no native integral wireless capability (such as a camera or a portable audio device) into which a WEMM 1000 is inserted. The resulting combination being a WMED 2100 as previously defined. A WMED communicates with an RWED (e.g. mobile phone) having at least one wireless interface. In FIG. 2, the WMED 2100 communicates with the RWED 2200 over a WX$_1$AN 2300 (a wireless area network of a first type), such as the BlueTooth Wireless Personal Area Network (WPAN) standard. To illustrate a more general system, the RWED 2200 of FIG. 2 is a Dual WX$_1$AN/WX$_2$AN device (i.e., it has two wireless interfaces), such as a mobile phone or wireless-enabled PDA.

In many applications, the WMED 2100 and its associated user interface will be unaware of the capabilities of the WEMM 1000 and offer no means to control it. In an illustrative embodiment, the WX$_1$AN 2300 connection enables the RWED 2200 to access the content within the memory of the WEMM 1000 through a browser-server relationship. The server functionality 1635, which has an associated implementation of the WAP-over-BlueTooth protocol, is stored in the WEMM's integral firmware 1630 and is performed via the WEMM's integral processor 1610. (WAP is the Wireless Application Protocol.)

Thus the user interface to the WEMM 1000 is accomplished via an embedded WAP/Web server 1635 within the WEMM 1000 communicating with a WAP browser on the RWED 2200. The RWED browser-based interface allows the user to:

Browse the contents of the memory (as discussed below, either/both of 1100 or/and 1200) in the WEMM, viewing thumbnail size versions created by an embedded media scaling engine 1300;

Send a multimedia object (e.g., a photograph), optionally scaled to one of a number of sizes via the scaling engine, as an MMS (Multimedia Message Service, a multimedia extension of SMS) or email attachment via a cell phone; and Load a received attachment into the WEMM for storage or for use (e.g., viewing on a camera).

In an alternate embodiment, the user interface makes use of the knowledge of the memory controller of the last file written to allow short cuts, such as "send the last photograph taken".

In an alternate embodiment, the remote device implements a custom user interface created with the SmartPhone2002 or J2ME Java engines instead of the generic WAP browser.

The Dual WX$_1$AN/WX$_2$AN RWED 2200 is in turn connected to a WX$_2$AN system 2500 (a wireless area network of a second type), such as the GSM Wireless Wide Area Network (WWAN) standard, which in turn connects through a Gateway 2600 to the Internet 2700. The RWED 2200 can then retrieve content from the memory (either/both of 1100 or/and 1200) in the WEMM 1000 via the WX$_1$AN 2300 and send it (for example in e-mail or MMS form) via the WX$_2$AN 2500 through a Gateway 2600 to the Internet 2700.

To accommodate the lower-speed interfaces that may be employed, either between the WEMM 1000 and the remote device 2200, or between the remote device 2200 and its WXAN 2500, the WEMM additionally includes processing functionality to scale the size of an individual media item that is sent to the remote device. When the user wishes to browse the content of the memory in the WEMM from the remote device, the WEMM 1000 would send "thumbnail" scaled versions through the BlueTooth connection 2300, for quick browsing. When a media item is selected, it can be sent to the remote device 2200 in one of a number of larger scaling levels, depending on the wireless bandwidths involved.

In an illustrative embodiment using a low-speed Bluetooth interface, camera owners will be able to send postcard versions of snapshots via a mobile phone, using cameras that do not have integral wireless network capability. The invention thus will enable and expand the market for sending and receiving snapshots over wireless networks.

In an illustrative embodiment using a high-speed Bluetooth interface, large high-resolution files may be transferred between a camera equipped with the wireless-enabled memory module and a PC. The invention thus will enable and expand the market for PC-based digital photography, including storage, backup, and archiving of digital photographs.

Other system applications of the wireless-enabled memory module enable other devices to communicate via a mobile phone or to computing devices such as PCs. An example is transfer of MP3 files between an MP3 player and a mobile phone, for associated transfer via the mobile phone network, by equipping the MP3 player with a wireless-enabled memory module having a low-speed Bluetooth implementation. Another example is transfer of large music files between an audio device (e.g. a home entertainment system) and a PC, by equipping the audio device with a wireless-enabled memory module having a high-speed Bluetooth implementation.

As an implementation option, the memory capability of the WEMM 1000 is implemented using an embedded fixed size memory 1200, a removable memory 1100 (for example a removable SD memory device), or both. In an illustrative embodiment, the removable memory is a second-level module and the wireless-enabled memory module is a first-level module, such as those disclosed by U.S. Pat. No. 6,353,870, CLOSED CASE REMOVABLE EXPANSION CARD HAV-

ING INTERCONNECT AND ADAPTER CIRCUITRY FOR BOTH I/O AND REMOVABLE MEMORY.

Figure 3:
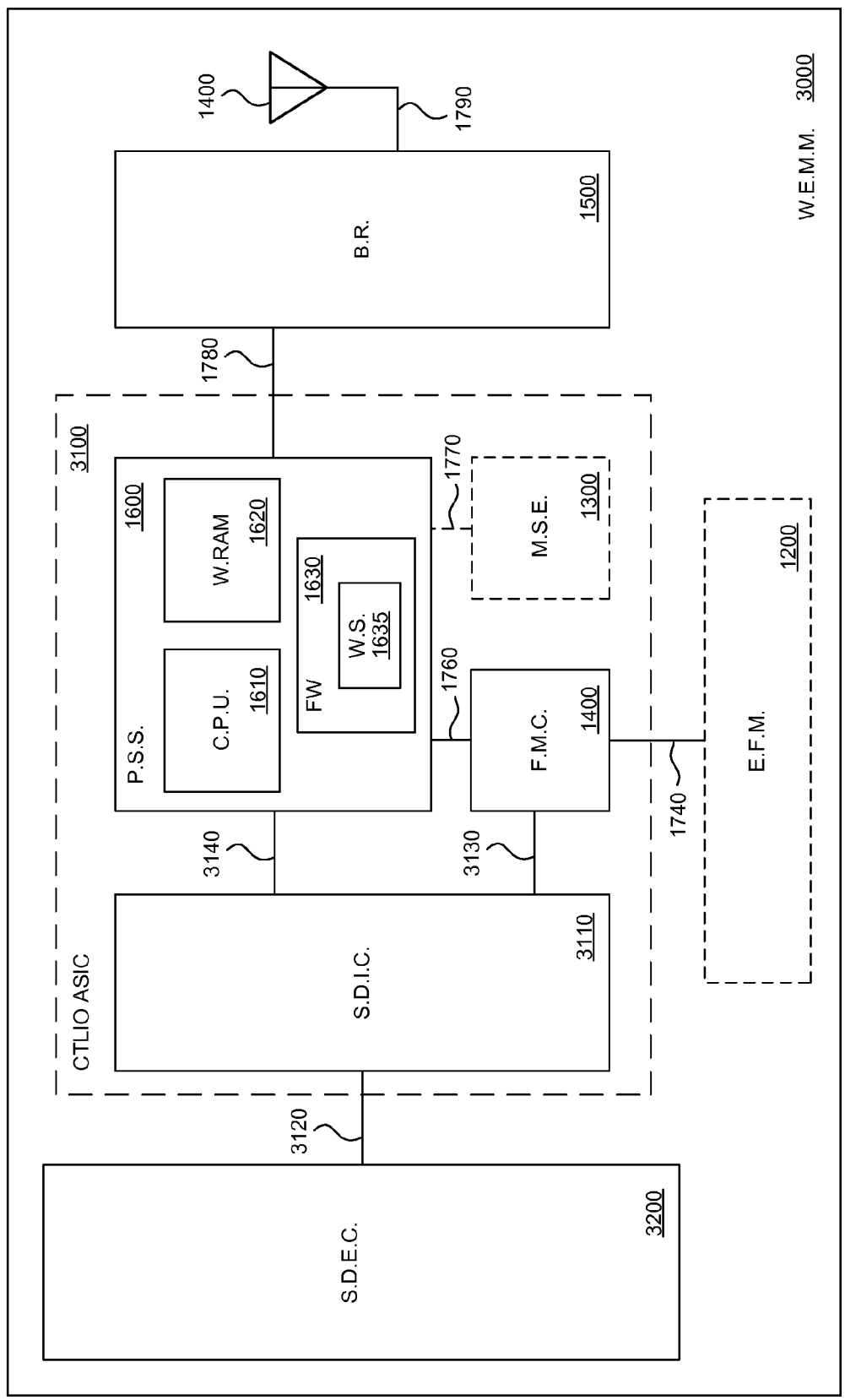
FIG. 3 is a block diagram of a WEMM 3000, physically and electrically compatible with the Secure Digital expansion module standard, and in accordance with the present invention.

Table 3 identifies and expands the abbreviations used in FIG. 3.

TABLE 3

| Associated ID No. | Abbreviation(s) | Expanded Name |
| --- | --- | --- |
| 1200 | E.F.M. | Embedded Flash Memory |
| 1300 | M.S.E. | Media Scaling Engine |
| 1400 | F.M.C. | Flash Memory Controller |
| 1500 | B.R. | Bluetooth Radio |
| 1600 | P.S.S. | Processor Sub-System |
| 1610 | C.P.U. | Processor |
| 1620 | W.RAM | Working RAM |
| 1630 | FW | Firmware |
| 1635 | W.S. | Web Server |
| 3000 | W.E.M.M. | Wireless Enabled Memory Module |
| 3100 | CNTLIO | Control & I/O ASIC |
| 3110 | S.D.I.C. | Secure Digital Interface Controller |
| 3200 | S.D.E.C. | Secure Digital expansion connector |

An alternative embodiment is shown in FIG. 3, a block diagram of a WEMM 3000 according to the invention as implemented in an SD form factor. A custom ASIC 3100, as shown, could be optionally implemented, including e.g., the microprocessor 1600, memory interface 3110, media scaling engine 1300 and memory controller 1400 all on one chip.

In an illustrative embodiment, the WEMM 3000 processing capability includes the ability to rescale the media objects, including JPEG images and MP3 audio stored in the modules memory on the fly. This allows the WAP/Web interface to provide thumbnail images and highly compressed audio versions of the contents of the WEMM 3000 and to rescale media objects, including photos and audio recordings, to an appropriate size and quality for transmission over the wireless network.

Media objects (images and audio) are sent as an email message either via the phone's built in email capability or using an embedded SMTP/PPP stack over the phone's IP network connection (e.g. GPRS). In another embodiment, the images may be sent as an MMS message.

Figure 4B:
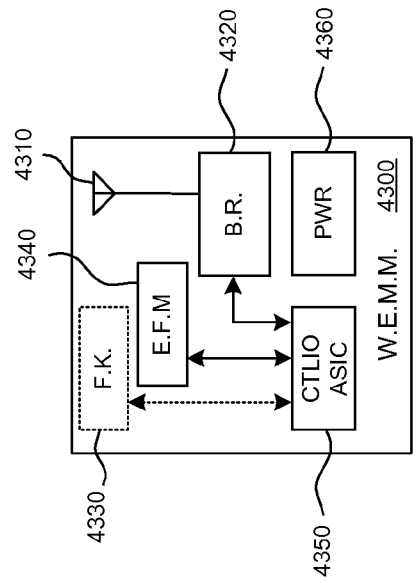
FIGS. 4A and 4B depict further illustrative embodiments or the present invention, 4000 and 4300 respectively, in which power is supplied to the WEMM either from a customer Portable Server or from an onboard Power Source.
Figure 4A:
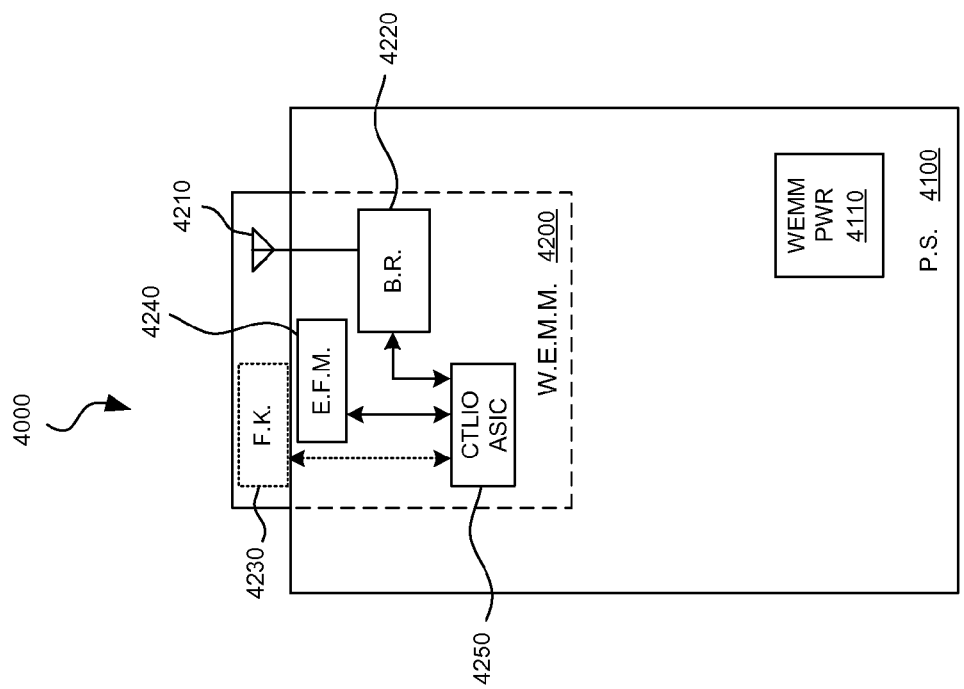

Two alternative embodiments, illustrated in FIGS. 4A and 4B, show how a WEMM (4200 in FIG. 4A, 4300 in FIG. 4B) can be used separately from the host device, when the host device does not require access to the memory. FIG. 4A shows an embodiment of a combination 4000 in which a special "holder" 4100 containing a power source 4110 is used in place of the full-function host, acting as a portable storage server and providing power to the WEMM 4200. Alternatively, FIG. 4B illustrates an embodiment in which a WEMM 4300 itself incorporates a power source 4360.

Table 4 identifies and expands the abbreviations used in FIGS. 4A and 4B.

TABLE 4

| Associated ID No. | Abbreviation(s) | Expanded Name |
| --- | --- | --- |
| 4000 | (none) | (none) |
| 4100 | P.S. | Portable Server |
| 4110 | WEMM PWR | Wireless Enabled Memory Module Power Source |
| 4200 | W.E.M.M. | Wireless Enabled Memory Module |
| 4220 | B.R. | Bluetooth Radio |
| 4230 | F.K. | F-key(s) |
| 4240 | E.F.M. | Embedded Flash Memory |
| 4250 | CTLIO | Control & I/O ASIC |

TABLE 4-continued

| Associated ID No. | Abbreviation(s) | Expanded Name |
| --- | --- | --- |
| 4300 | W.E.M.M. | Wireless Enabled Memory Module |
| 4320 | B.R. | Bluetooth Radio |
| 4330 | F.K. | F-key(s) |
| 4340 | E.F.M. | Embedded Flash Memory |
| 4350 | CTLIO | Control & I/O ASIC |
| 4360 | PWR | Power Source |

FIGS. 4A and 4B also illustrate that the WEMM has at least one Function-key (F-key, i.e. a button with an associated configurable function). The F-key(s) are identified as 4230 in FIG. 4A and as 4330 in FIG. 4B. Example key functions include (a) e-mailing the last-taken photo to a pre-configured address, and (b) transferring the last-taken photo to the mobile phone in preparation for manual addressing and sending.

CONCLUSION

Although the present invention has been described using particular illustrative embodiments, it will be understood that many variations in construction, arrangement and use are possible consistent with the teachings and within the scope of the invention. Functionally equivalent techniques known to those skilled in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware).

All such variations in design comprise insubstantial changes over the teachings conveyed by the illustrative embodiments. The names given to interconnect and logic are illustrative, and should not be construed as limiting the invention. It is also understood that the invention has broad applicability to other applications, and is not limited to the particular application or industry of the illustrated embodiments. The present invention is thus to be construed as including all possible modifications and variations encompassed within the scope of the appended claims.

What is claimed is:

1. A system comprising:
   a host-to-module interconnect enabled to couple removably with a host;
   a host-to-module interface controller coupled to the host-to-module interconnect;
   wireless transceiver circuitry enabled to couple with a wireless network;
   a non-volatile memory controller enabled to couple to a non-volatile memory;
   a control sub-system enabled to manage selective transfer of data between the non-volatile memory and the host, at least in part via the host-to-module interface controller and the non-volatile memory controller, the control sub-system being further enabled to manage, without requiring any action by the host, selective transfer of data between the non-volatile memory and the wireless network, the at least in part via the wireless transceiver circuitry and the non-volatile memory controller; and wherein the system host-to-module interface controller, the wireless transceiver circuitry, the non-volatile memory controller, and the control sub-system, are enabled to operate completely inside the host.

2. The system of claim 1, further comprising the non-volatile memory, and the non-volatile memory comprises an embedded non-volatile memory.

3. The system of claim 1, further comprising a slot enabled to receive a removable non-volatile memory, and the non-volatile memory comprises the removable non-volatile memory.

4. The system of claim 1, further comprising a housing containing the host-to-module interface controller, the wireless transceiver circuitry, the non-volatile memory controller, and the control sub-system.

5. The system of claim 1, further comprising the host.

6. The system of claim 5, wherein the host comprises one or more of a digital camera and an MP3 player.

7. The system of claim 1, further comprising the non-volatile memory.

8. The system of claim 7, wherein the non-volatile memory and the non-volatile memory controller are implemented in accordance with one or more of a CompactFlash (CF) standard and a Secure Digital (SD) standard.

9. The system of claim 1, wherein the control sub-system comprises a processor, a working RAM, and firmware.

10. The system of claim 1, further comprising a remote wireless device enabled to communicate via the wireless network.

11. The system of claim 10, wherein the remote wireless device comprises one or more of a mobile phone, PDA, and PC.

12. A method comprising:
via a control sub-system, managing selective transferring of data between a non-volatile memory and a host, at least in part via a host-to-module interface controller and a non-volatile memory controller;
via the control sub-system, managing, without requiring any action by the host, selective transferring of data between the non-volatile memory and a wireless network, at least in part via a wireless transceiver circuitry and the non-volatile memory controller;
wherein the host-to-module interface controller is coupled to a host-to-module interconnect that is enabled to couple removably with the host; and
wherein the host-to-module interface controller, the wireless transceiver circuitry, the non-volatile memory controller, and the control sub-system are enabled to operate completely inside the host.

13. The method of claim 12, wherein the non-volatile memory comprises an embedded non-volatile memory.

14. The method of claim 12, wherein the non-volatile memory comprises a removable non-volatile memory.

15. The method of claim 14, wherein the removable non-volatile memory and the non-volatile memory controller are implemented in accordance with one or more of a CompactFlash (CF) standard and a Secure Digital (SD) standard.

16. The method of claim 12, wherein the host-to-module interface controller, the wireless transceiver circuitry, the non-volatile memory controller, and the control sub-system are contained in a housing.

17. The method of claim 12, wherein the host comprises one or more of a digital camera and an MP3 player.

18. A system comprising:
means for removably coupling with a host;
means for interfacing with the host, the means for interfacing being coupled to the means for removably coupling;
means for coupling with a wireless network;
means for controlling a non-volatile memory;
means for managing selective transfer of data between the non-volatile memory and the host, at least in part via means for interfacing with the host and the means for controlling the non-volatile memory;
means for managing selective transfer of data between the non-volatile memory and the wireless network, at least in part via the means for coupling with the wireless network and the means for controlling the non-volatile memory;
wherein the means for managing selective transfer of data between the non-volatile memory and the wireless network is configured to operate without requiring any action by the host; and
wherein the system is enabled to operate completely inside the host.

19. The system of claim 18, wherein the means for interfacing with the host, the means for coupling with the wireless network, the means for controlling the non-volatile memory, the means for managing selective transfer of data between the non-volatile memory and the host, and the means for managing selective transfer of data between the non-volatile memory and the wireless network are contained in a housing.

20. The system of claim 18, further comprising the non-volatile memory.

* * * * *